United States Patent
Nakagawa et al.

(10) Patent No.: US 10,358,985 B2
(45) Date of Patent: Jul. 23, 2019

(54) CONTROL DEVICE AND CONTROL METHOD

(71) Applicant: MITSUBISHI HEAVY INDUSTRIES COMPRESSOR CORPORATION, Tokyo (JP)

(72) Inventors: Yosuke Nakagawa, Tokyo (JP); Naoto Yonemura, Hiroshima (JP); Kazuhiro Jahami, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 369 days.

(21) Appl. No.: 15/305,756

(22) PCT Filed: Jul. 31, 2014

(86) PCT No.: PCT/JP2014/070162
§ 371 (c)(1),
(2) Date: Oct. 21, 2016

(87) PCT Pub. No.: WO2016/016983
PCT Pub. Date: Feb. 4, 2016

(65) Prior Publication Data
US 2017/0044997 A1    Feb. 16, 2017

(51) Int. Cl.
*F02C 9/54* (2006.01)
*F02C 7/22* (2006.01)
(Continued)

(52) U.S. Cl.
CPC ............ *F02C 9/54* (2013.01); *F02C 7/22* (2013.01); *F04D 27/002* (2013.01);
(Continued)

(58) Field of Classification Search
CPC ........ F02C 9/54; F02C 7/22; F02C 3/22; F02C 7/232; F02C 9/263; F02C 9/28;
(Continued)

(56) References Cited

FOREIGN PATENT DOCUMENTS

JP  2005-76461 A   3/2005
JP  4191563 B2   12/2008

OTHER PUBLICATIONS

International Search Report for PCT/JP2014/070162 dated Oct. 28, 2014.
(Continued)

*Primary Examiner* — Steven M Sutherland
*Assistant Examiner* — Jacek Lisowski
(74) *Attorney, Agent, or Firm* — Birch, Stewart, Kolasch & Birch, LLP

(57) ABSTRACT

A control device that controls a fuel gas supply system that has: a compressor that supplies compressed fuel gas to a load apparatus; an inflow amount regulating means that regulates the amount of fuel gas that flows into the compressor; an anti-surge valve that is for returning to an inlet side of the compressor fuel gas that is discharged from the compressor; and an inlet pressure-regulating valve that regulates the pressure of fuel gas supplied toward the inflow amount regulating means. The control device includes: a main pressure-regulating unit that controls the inflow amount regulating means and the anti-surge valve using a first feedforward control value that is generated on the basis of the load of the load apparatus and of a first conversion process and using a feedback control value that is generated on the basis of the deviation between a set value and a measured value for the discharge pressure of the compressor; and an inlet pressure-regulating unit that controls the inlet pressure-regulating valve using a second feedforward
(Continued)

control value that is generated on the basis of the load of the load apparatus and of a second conversion process.

12 Claims, 8 Drawing Sheets

(51) Int. Cl.
 *F04D 27/00* (2006.01)
 *F04D 27/02* (2006.01)
(52) U.S. Cl.
 CPC ....... *F04D 27/003* (2013.01); *F04D 27/0207* (2013.01); *F04D 27/0223* (2013.01); *F04D 27/0246* (2013.01); *F05D 2220/32* (2013.01); *F05D 2270/091* (2013.01); *F05D 2270/101* (2013.01); *F05D 2270/3011* (2013.01); *F05D 2270/3013* (2013.01)
(58) Field of Classification Search
 CPC ...... F02C 9/30; F02C 9/40; F02C 9/44; F04D 27/002; F04D 27/003; F04D 27/0207; F04D 27/0246; F05D 2270/091; F05D 2270/101; F05D 2270/3011; F05D 2270/3013; F05D 2220/32
 See application file for complete search history.

(56) References Cited

OTHER PUBLICATIONS

Written Opinion of the International Searching Authority for PCT/JP2014/070162 dated Oct. 28, 2014 with English Translation.

CONTROL DEVICE AND CONTROL METHOD

TECHNICAL FIELD

The present invention relates a control device and a control method of a compressor which compresses fuel gas.

BACKGROUND ART

A fuel gas supply system has been suggested, which includes control means for adjusting an amount of fuel gas supplied to a load apparatus such as a gas turbine so as to maintain a discharge pressure of a compressor which compresses the fuel gas within a set range.

However, in the fuel gas supply system of the related art, in some cases, it is not possible to appropriately cope with rapid variation of consumption in the fuel gas which is generated during interruption of a load, during tripping of a gas turbine, or the like. Accordingly, a technology has been suggested, which maintains a discharge pressure of a compressor at a set value by controlling an opening degree of an inlet guide vane (IGV) provided in the compressor, and returns a portion of the fuel gas discharged from the compressor to an inlet side of the compressor by rapidly opening an anti-surge valve (ASV) (also referred to as a recycle control valve (RCV)) which is connected to an outlet of the compressor during interruption of the compressor or the like so as to avoid so-called surging.

In addition, a fuel gas supply system has been suggested, which further improves the above-described fuel gas supply system, and can obtain improved control results not only during normal operation but also during interruption of the load, tripping of the compressor and the gas turbine, or the like, by using not only the inlet guide vane but also the anti-surge valve so as to control the discharge pressure of the compressor (for example, refer to PTL 1).

CITATION LIST

Patent Literature

[PTL 1] Japanese Unexamined Patent Application Publication No. 2005-076461

SUMMARY OF INVENTION

Technical Problem

Compared to the fuel gas supply system of the related art, the fuel gas supply system disclosed in PTL 1 is improved. However, according to the fuel gas supply system disclosed in PTL 1, in a case where rapid load variation such as interruption of a load occurs, overshoot and undershoot by a predetermined amount in the pressure which is a feedback control object may occur, and a little time is required until stability is obtained.

The present invention provides a control device and a control method capable of more immediately stabilizing variation of the pressure in a case where rapid load variation occurs in a load apparatus.

Solution to Problem

According to a first aspect of the present invention, there is provided a control device which controls a fuel gas supply system which includes a compressor which compresses fuel gas and supplies the compressed fuel gas to a load apparatus, inflow amount regulating means for regulating an amount of fuel gas which flows into the compressor, an anti-surge valve for returning the fuel gas discharged from the compressor to an inlet side of the compressor, and an inlet pressure control valve which regulates a pressure of the fuel gas supplied to the inflow amount regulating means, in which the control device includes: a main pressure control unit which controls the inflow amount regulating means and the anti-surge valve using a first feedforward control value which is generated on the basis of a load of the load apparatus and a predetermined first conversion process, and a feedback control value which is generated on the basis of a deviation between a set value of a discharge pressure of the compressor and a measured value of the discharge pressure of the compressor; and an inlet pressure control unit which controls the inlet pressure control valve using a second feedforward control value which is generated on the basis of the load of the load apparatus and a second conversion process different from the first conversion process.

According to a second aspect of the present invention, in the above-described control device, the inlet pressure control unit controls the inlet pressure control valve on the basis of the second feedforward control value when the inlet pressure control unit receives a notification signal indicating that a load variation per unit time in the load apparatus is a predetermined variation width or more.

According to a third aspect of the present invention, the above-described control device further includes an opening degree correction calculation unit which corrects the second feedforward control value on the basis of a design value of a state quantity indicating a state of the fuel gas on an upstream side of the inlet pressure control valve, and a measured value of the state quantity indicating the state of the fuel gas on the upstream side of the inlet pressure control valve.

According to a fourth aspect of the present invention, the above-described control device further includes a bias adder unit which performs correction by adding a predetermined bias value defined in advance to the second feedforward control value generated by the inlet pressure control unit.

According to a fifth aspect of the present invention, in the above-described control device, the inlet pressure control unit controls the inlet pressure control valve on the basis of both of the second feedforward control value, and an inlet feedback control value which is generated on the basis of a deviation between a set value and a measured value of the pressure of the fuel gas which is supplied to the inflow amount regulating means.

According to a sixth aspect of the present invention, there is provided a control method which controls a fuel gas supply system which includes a compressor which compresses fuel gas and supplies the compressed fuel gas to a load apparatus, inflow amount regulating means for regulating an amount of fuel gas which flows into the compressor, an anti-surge valve for returning the fuel gas discharged from the compressor to an inlet side of the compressor, and an inlet pressure control valve which regulates a pressure of the fuel gas supplied to the inflow amount regulating means, in which the control method includes: a step of controlling the inflow amount regulating means and the anti-surge valve using a first feedforward control value which is generated on the basis of a load of the load apparatus and a predetermined first conversion process, and a feedback control value which is generated on the basis of a deviation between a set value of a discharge pressure of the compressor and a measured value of the discharge pressure of the compressor by a main pressure control unit; and a step of controlling the inlet pressure control valve using a second feedforward control value which is generated on the basis of the load of the load apparatus and a second conversion process different from the first conversion process by an inlet pressure control unit.

Advantageous Effects of Invention

According to the above-described control device and control method, it is possible to more immediately stabilize variation in a pressure in a case where rapid load variation occurs in a load apparatus.

DESCRIPTION OF EMBODIMENTS

First Embodiment

Hereinafter, a fuel gas supply system according to a first embodiment is described in detail with reference to FIGS. 1 to 6.

Figure 1:
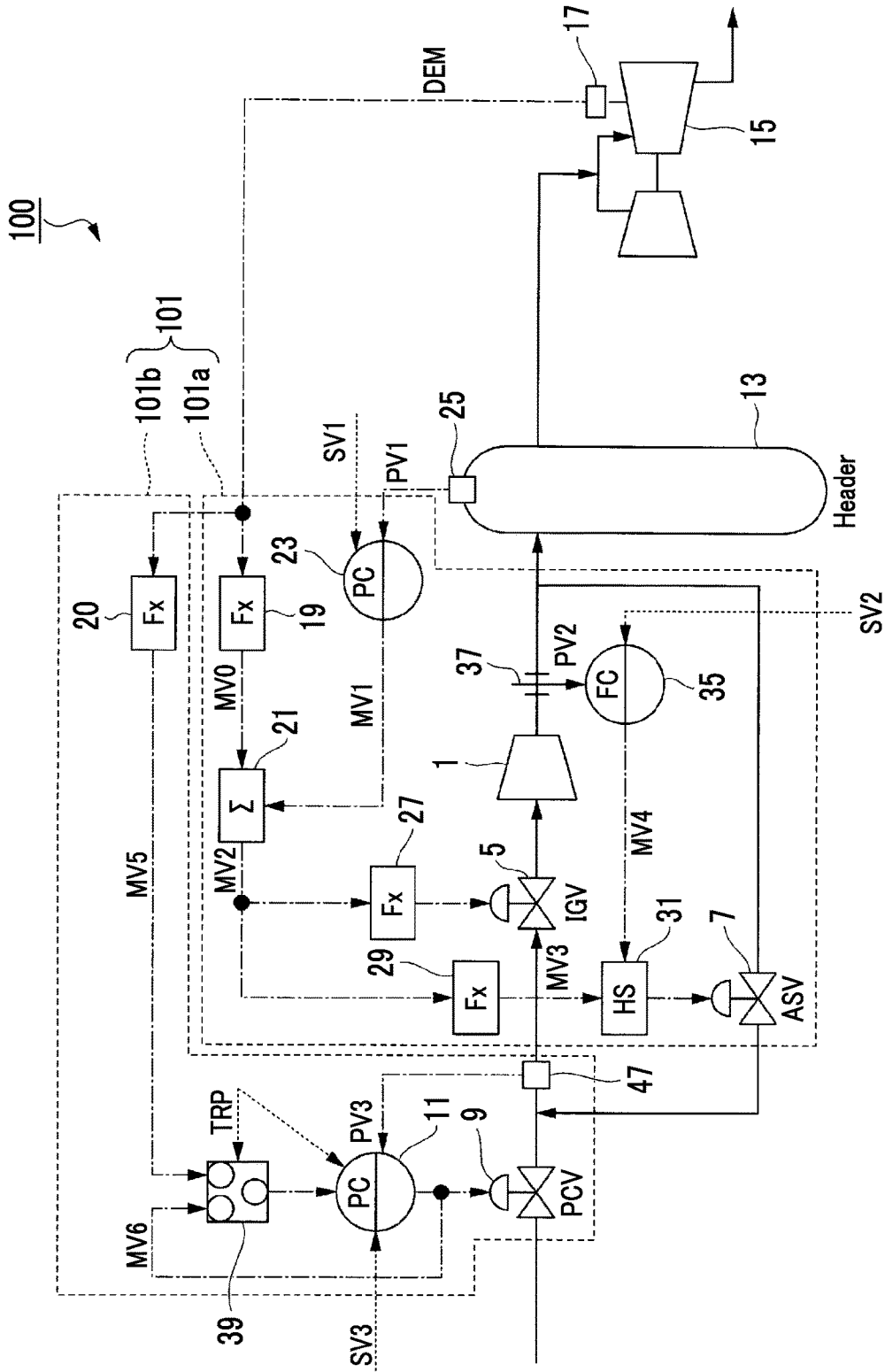
FIG. 1 is a diagram showing a functional configuration of a fuel gas supply system according to a first embodiment.

FIG. 1 is a diagram showing a functional configuration of a fuel gas supply system according to a first embodiment.

As shown in FIG. 1, a fuel gas supply system 100 includes a compressor 1, an inlet guide vane (hereinafter, referred to as IGV 5) which is inflow amount regulating means, an anti-surge valve (hereinafter, referred to as ASV 7), an inlet pressure control valve (hereinafter, referred to as PCV 9 (PCV: Pressure Control Valve)), a header tank 13, and a control device 101.

The fuel gas supply system 100 supplies fuel gas to a gas turbine 15 (load apparatus) which is a supply destination of compressed fuel gas. A supply amount of the fuel gas is determined by a demand signal DEM which is output by a load command 17. The demand signal DEM output by the load command 17 defines a target value of a load of the gas turbine 15, a control device 101 described below receives the demand signal DEM, and thus, the fuel gas of an amount corresponding to the target value of the load of the gas turbine 15 is supplied by the fuel gas supply system 100.

The compressor 1 compresses the fuel gas supplied through the PCV 9 and the IGV 5, and supplies the compressed fuel gas to the gas turbine 15 via the header tank 13.

The IGV 5 is disposed in a pipe which connects the PCV 9 and the compressor 1, and is a valve which regulates an amount of the fuel gas which flows into the compressor 1.

The ASV 7 is a valve which regulates a flow rate of the fuel gas, and returns the compressed fuel gas discharged from the compressor 1 to an inlet side (the upstream side of the IGV 5 in the pipe which connects the PCV 9 and the compressor 1) of the compressor 1.

The PCV 9 is a valve which regulates the pressure of the fuel gas supplied from the outside (a generation source (not shown) of the fuel gas) to the IGV 5. In general, the PCV 9 is controlled by a pressure controller 11 described below such that the pressure in the pipe which connects the PCV 9 and the IGV 5 is a constant value which is a set value defined in advance.

The control device 101 includes a main pressure control unit 101a and an inlet pressure control unit 101b.

In addition, in the example shown in FIG. 1, an aspect in which a single gas turbine 15 is connected to the header tank 13 is shown. However, the present invention is not limited to this, and a plurality of gas turbines 15 may be connected to the header tank 13.

Figure 2:
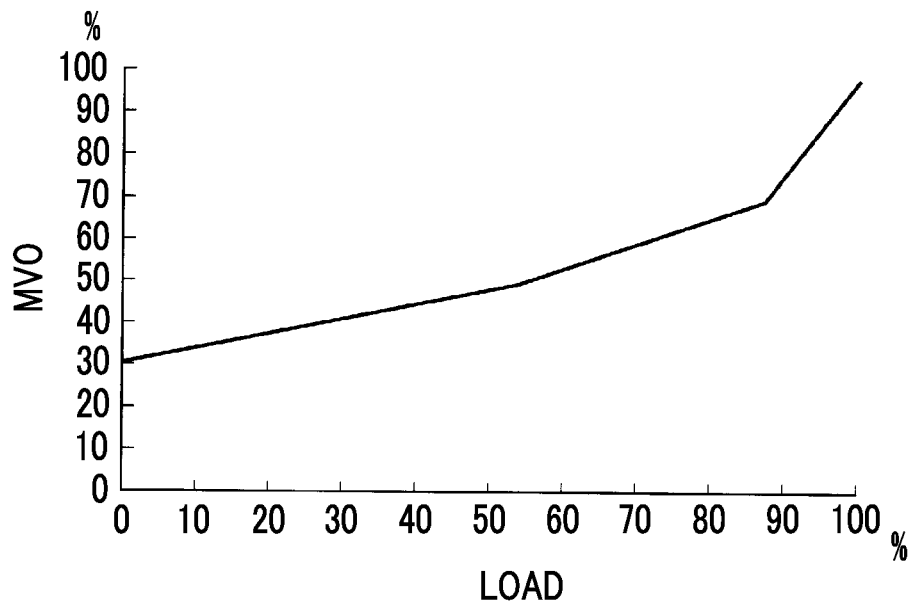
FIG. 2 is a first diagram explaining a function of a main pressure control unit according to the first embodiment.
Figure 3:
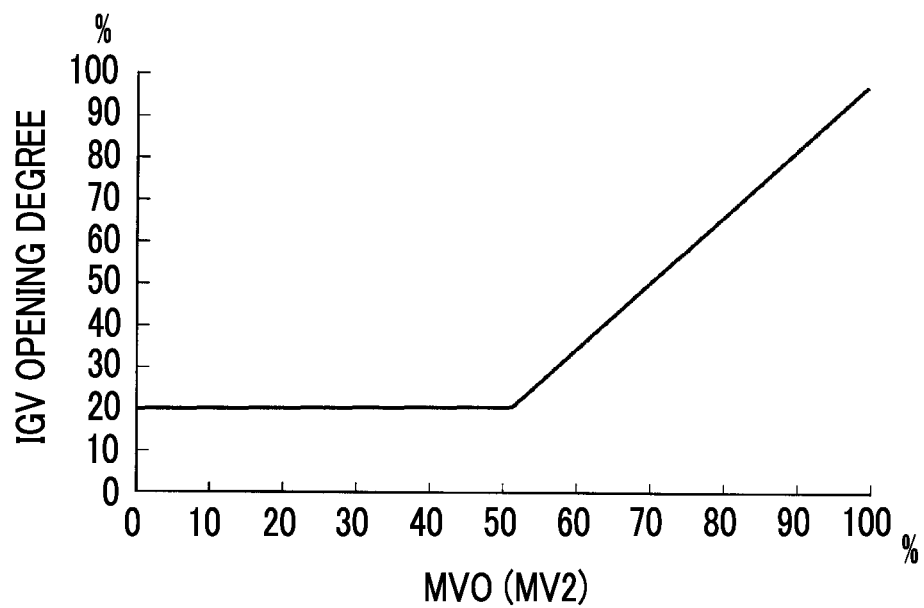
FIG. 3 is a second diagram explaining the function of the main pressure control unit according to the first embodiment.
Figure 4:
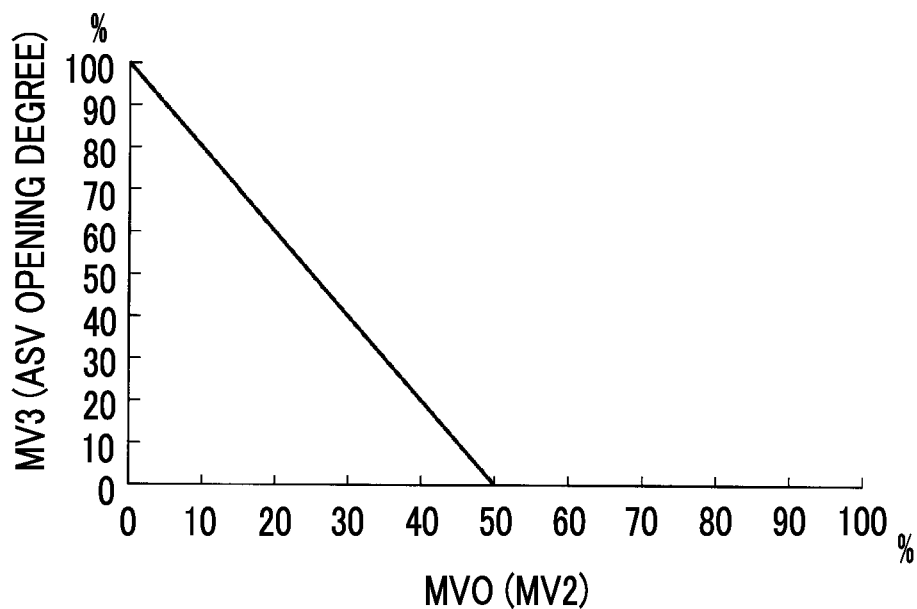
FIG. 4 is a third diagram explaining the function of the main pressure control unit according to the first embodiment.

FIGS. 2, 3, and 4 respectively are a first diagram, a second diagram, and a third diagram explaining the function of the main pressure control unit according to the first embodiment.

Hereinafter, in addition to FIG. 1, the function of the main pressure control unit 101a is described with reference to FIGS. 2 to 4.

As shown in FIG. 1, the main pressure control unit 101a includes function generators 19, 27, 29, an adder 21, a pressure controller 23 (PC), a flow controller 35 (FC), and a high-level selection unit 31.

When the gas turbine 15 is operated, the load command 17 sends a demand signal DEM to the function generator 19. The demand signal DEM is applied as a load rate in a case where the maximum load of the gas turbine 15 is set to 100%.

The demand signal DEM output by the load command 17 on the basis of a function exemplified in FIG. 2 is input to the function generator 19, and the function generator 19 performs a first conversion process in which the demand signal DEM is converted into a first feedforward control value MV0 and outputs a control signal indicating the first feedforward control value MV0. The first feedforward control value MV0 indicated by the control signal output by the function generator 19 is input to the adder 21.

A signal indicating an actual pressure (actual discharge pressure PV1), which is the pressure of the fuel gas discharged to the gas turbine 15 by the compressor 1 and is detected by a pressure meter 25, is input to the pressure controller 23, and the pressure controller 23 outputs a control signal indicating a first feedback control value MV1 for allowing the actual discharge pressure PV1 to coincide with a predefined set value (set pressure SV1). Specifically, the pressure controller 23 calculates the first feedback control value MV1 which is obtained by performing a Proportional Integral (PI) processing on deviation between the set pressure SV1 and the detected actual discharge pressure PV1, and outputs a control signal corresponding to the first feedback control value MV1 to the adder 21.

The adder 21 performs calculation which adds the first feedforward control value MV0 and the first feedback control value MV1 so as to obtain an intermediate control value MV2, and outputs a signal corresponding to the intermediate control value MV2 to the function generator 27 and the function generator 29.

The function generator 27 outputs a valve control signal on the basis of a function exemplified in FIG. 3 to the IGV 5. For example, the function generator 27 maintains an IGV opening degree (opening degree in valve of IGV 5) to 20% (corresponding to the minimum opening degree) until the first feedforward control value MV0 becomes 50%, forms a valve control signal by which the IGV opening degree is linearly increased from 20% to 100% (corresponding to the maximum opening degree) as the first feedforward control value MV0 increases from 50%, and outputs this valve signal to the IGV 5.

The function generator 29 outputs a valve control signal on the basis of a function exemplified in FIG. 4 to the high-level selection unit 31. For example, the function generator 29 sets an intermediate control value MV3 which linearly decreases the ASV opening degree (opening degree in the valve of the ASV 7) from 100% (corresponding to the maximum opening degree) to 0% (corresponding to the minimum opening degree) until the first feedforward control value MV0 becomes 50% and maintains the ASV opening degree to 0% when the first feedforward control value MV0 is 50% or more, and outputs a signal corresponding to the intermediate control value MV3 to the high-level selection unit 31.

The flow controller 35 calculates a second feedback control value MV4 which is corresponding to deviation between a set value (set flow rate SV2) of a discharge flow rate which is the flow rate of the fuel gas supplied form the compressor 1 to the header tank 13 and is defined in advance, and a flow rate (actual discharge flow rate PV2) detected actually by a flow-meter 37, and outputs a signal corresponding to the second feedback control value MV4 to the high-level selection unit 31.

The high-level selection unit 31 compares the signal indicating the intermediate control value MV3 output from the function generator 29 and the signal indicating the second feedback control value MV4 output by the flow controller 35 with each other, and outputs the signal which is greater between two signals to the ASV 7 as a valve control signal.

According to the above-described configuration, the main pressure control unit 101a controls the IGV 5 and the ASV 7 using the first feedforward control value MV0 which is generated on the basis of the load (the load indicated by the demand signal DEM) of the gas turbine 15 and the first conversion process, and the first feedback control value MV1 which is generated on the basis of the deviation between the set value (set pressure SV1) of the discharge pressure of the compressor 1 and the measured value (actual discharge pressure PV1) of the discharge pressure of the compressor 1.

Since the specific effects according to the configuration of the main pressure control unit 101a are the same as those disclosed in PTL 1, detailed descriptions thereof are omitted. According to the above-described functional configuration of the main pressure control unit 101a, since the discharge pressure is controlled by combination of the feedforward control and the feedback control, a pressure control having high responsibility can be achieved. Accordingly, even in a case where a rapid load demand is made in the gas turbine 15, it is possible to control variation of the discharge pressure.

Figure 5:
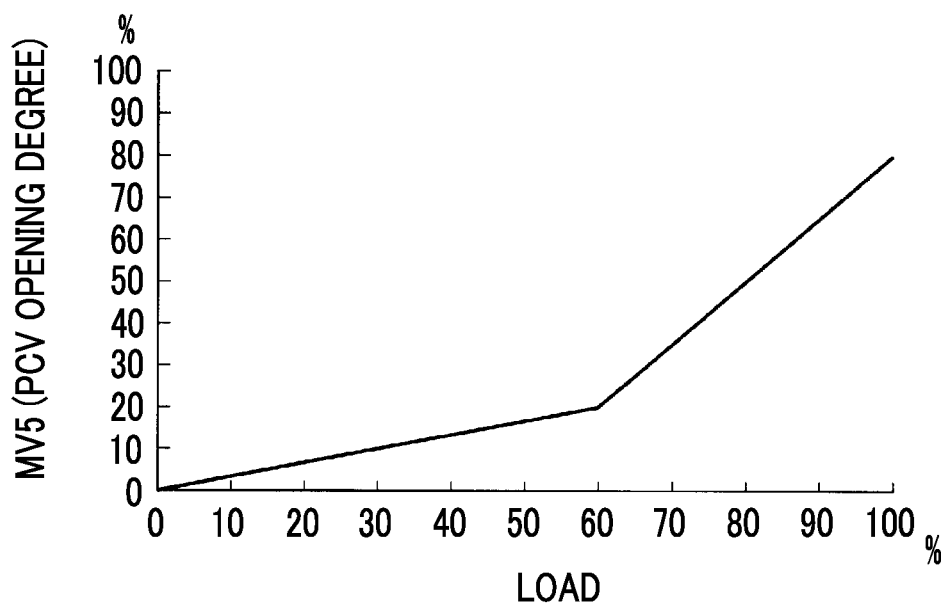
FIG. 5 is a diagram explaining a function of an inlet pressure control unit according to the first embodiment.

FIG. 5 is a diagram explaining the function of the inlet pressure control unit according to the first embodiment.

Hereinafter, in addition to FIG. 1, the function of the inlet pressure control unit 101b is described with reference to FIG. 5.

As shown in FIG. 1, the inlet pressure control unit 101b includes a function generator 20, a pressure controller 11, and a control switching unit 39.

The function generator 20 performs a second conversion process in which the demand signal DEM output by the load command 17 is input and is converted into a second feedforward control value MV5 on the basis of a function exemplified in FIG. 5, and outputs a control signal indicating the second feedforward control value MV5. The second feedforward control value MV5 indicated by the control signal output from the function generator 20 is input to the control switching unit 39. The function (FIG. 5) used by the function generator 20 is described in detail below.

A signal indicating an actual pressure (actual inlet pressure PV3) which is the pressure of the fuel gas supplied to the IGV 5 and is detected by a pressure meter 41 is input to the pressure controller 11, and the pressure controller 11 outputs a control signal indicating an inlet feedback control value MV6 for allowing the actual inlet pressure PV3 to coincide with a predefined set value (set pressure SV3). Specifically, the pressure controller 11 calculates the inlet feedback control value MV6 which is obtained by performing a Proportional Integral (PI) processing on deviation between the set pressure SV3 and the detected actual discharge pressure PV3, and outputs a control signal corresponding to the inlet feedback control value MV6 to the control switching unit 39 and the PCV 9.

The control switching unit 39 switches the control of the PCV 9 to the control on the basis of the inlet feedback control value MV6 or the control on the basis of the second feedforward control value MV5. Specifically, the control switching unit 39 performs the control of the PVC 9 on the basis of the inlet feedback control value MV6 in a normal state in which the load of the gas turbine 15 is stable (normal mode). Meanwhile, in a case where rapid load variation such as interruption of the load or tripping occurs in the gas turbine 15, the control switching unit 39 switches the control of the PCV 9 to the control (emergency mode) on the basis of the second feedforward control value MV5. In addition, thereafter, the control switching unit 39 switches the control of the PCV 9 to the control (normal mode) on the basis of the inlet feedback control value MV6 again after a predetermined time (for example, approximately one to five seconds) which is defined in advance elapses.

In addition, in the case where the interruption of the load or the tripping occurs in the gas turbine 15, the gas turbine 15 outputs a notification signal TRP indicating that the load variation per unit time is a predetermined variation width or more. In a case where the control switching unit 39 receives the notification signal TRP, the control switching unit 39 switches the control of the PCV 9 from the normal mode to the emergency mode.

Moreover, similarly to the control switching unit 39, if the pressure controller 11 receives the notification signal TRP, the pressure controller 11 controls the PCV 9 on the basis of the second feedforward control value MV5 input through the control switching unit 39 (emergency mode). However, even during the emergency mode, the pressure controller 11 continuously acquires the actual inlet pressure PV3 through the pressure meter 41, calculates the inlet feedback control value MV6, and outputs the inlet feedback control value MV6 to the control switching unit 39. At this time, the inlet feedback control value MV6 is the same as the second feedforward control value MV5. In this way, when the mode is switched from the emergency mode to the normal mode again, it is possible to prevent occurrence of seam in the actual inlet pressure PV3.

Similarly, even during the normal mode, the function generator 20 calculates the second feedforward control value MV5 on the basis of the target value of the load normally indicating the demand signal DEM and the function shown in FIG. 5, and outputs the second feedforward control value MV5. In this way, it is possible to prevent delay until the feedforward control with respect to the PCV 9 is performed from timing when the mode is switched to the emergency mode.

According to the above-described configuration, in the normal state (during the normal mode), the inlet pressure control unit 101b controls the PCV 9 on the basis of the inlet feedback control value MV6 which is generated on the basis of the deviation between the set value (set pressure SV3) of the pressure of the fuel gas supplied to the IGV 5 and the measured value (actual inlet pressure PV3). In addition, in the case where the inlet pressure control unit 101b receives the notification signal TRP indicating that the load variation per unit time in the gas turbine 15 is a predetermined variation width or more (during the emergency mode), the inlet pressure control unit 101b controls the PCV 9 on the basis of the second feedforward control value MV5.

Here, as shown in FIG. 5, the function generator 20 calculates the second feedforward control value MV5 on the basis of a relationship between the target value of the load indicating the demand signal DEM output from the load command 17 and the PCV opening degree (the opening degree in the valve of the PCV 9). As shown in FIG. 5, the function generator 20 defines a relationship in which the PCV opening degree decreases as the target value indicated in the demand signal DEM output by the load command 17 decreases. More specifically, the function generator 20 defines a two-stage rate such that the PCV opening degree is changed at a first rate from 80% to 20% within a range of 100% to 60% of the target value of the load, and the PCV opening degree is changed at a second rate from 20% to 0% smaller than the first rate within a range of 60% to 0% of the target value of the load.

In this case, for example, in a case where the target value of the load of the gas turbine 15 is rapidly changed from 100% to 30% due to occurrence of tripping, the PCV opening degree indicated by the second feedforward control value MV5 instantaneously decreases from 80% to 10%.

Moreover, the function defined by the function generator 20 is not limited to the function shown in FIG. 5, and may define a function in which the PCV opening degree monotonously decreases with respect to the change in the reduction direction of the target value of the load indicated by the demand signal DEM.

Figure 6:
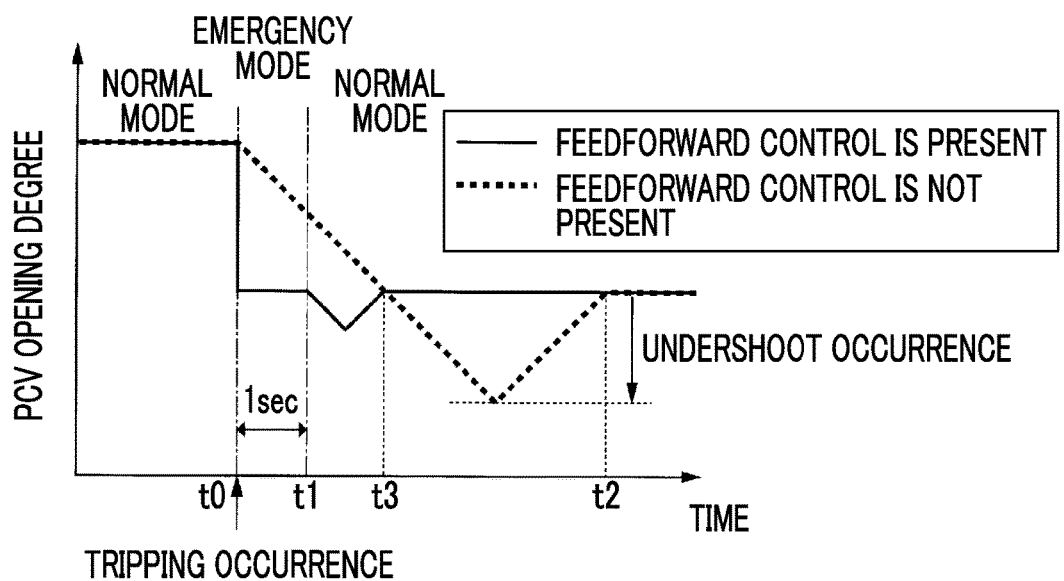
FIG. 6 is a diagram explaining operation effects of the inlet pressure control unit according to the first embodiment.

FIG. 6 is a diagram explaining operation effects of the inlet pressure control unit according to the first embodiment.

In the graph shown in FIG. 6, a horizontal axis indicates an elapse time, and a vertical axis indicates variation of the opening degree of the PCV 9. In addition, FIG. 6 exemplifies variation in a case where tripping occurs at a time t0 during the operation of the gas turbine 15.

First, as a comparative example with respect to the fuel gas supply system 100 according to the first embodiment, a fuel gas supply system in which the feedforward control of the second feedforward control value MV5 is not performed is described.

In the case where the feedforward control of the second feedforward control value MV5 is not performed, the PCV opening degree is always controlled on the basis of the inlet feedback control value MV6.

Here, a case where the tripping of the gas turbine 15 occurs at the time t0 and the target value of the load rapidly decreases is considered. In this case, since the load (that is, consumption of the fuel) of the gas turbine 15 rapidly decreases, the pressure (actual discharge pressure PV1) of the header tank 13 rapidly increases at the time t0. Accordingly, the main pressure control unit 101a performs the feedback control via the IGV 5 and the ASV 7 in order to maintain the actual discharge pressure PV1 to the set pressure SV1. However, in the feedback control via the IGV 5 and the ASV 7, since the control is always determined on the basis of the actual discharge pressure PV1 of the discharge pressure which is a control object, the control is unstable with respect to the rapid increase of the discharge pressure, and overshoot may occur. Accordingly, the pressure variation width in the header tank 13 increases, and a predetermined time (elapse time from time t0 to time t2) is required until the control is stable.

Meanwhile, the opening degree of the PCV 9 is feedback-controlled such that the inlet pressure (actual inlet pressure PV3) is constantly maintained by the pressure controller 11. Accordingly, as shown by a dashed line in FIG. 6, in order to decrease the pressure of the header tank 13, the opening degree of the PCV 9 gradually decreases (is changed in the direction in which the valve is closed) from the time t0. Relatively large undershoot occurs until the opening degree of the PCV 9 is completely stabilized at a predetermined opening degree with respect to the occurrence of the tripping.

Meanwhile, in the case of the inlet pressure control unit 101b of the fuel gas supply system 100 according to the first embodiment, at the time t0 when the tripping of the gas turbine 15 occurs, the control switching unit 39 and the pressure controller 11 receives the notification signal TRP from the gas turbine 15. Accordingly, the control switching unit 39 and the pressure controller 11 immediately switches the control of the PCV 9 to the control on the basis of the second feedforward control value MV5.

Here, as shown in FIG. 5, the function generator 20 has a function which defines a relationship between the target value of the load indicated by the demand signal DEM output from the load command 17 and the PCV opening degree. Accordingly, in a case where the load of the gas turbine 15 rapidly decreases from 100% to 30% due to the tripping, the second feedforward control value MV5 output by the function generator 20 instantaneously decreases from 80% to 10% on the basis of the demand signal DEM. Therefore, at the time t0 when the control switching unit 39 and the pressure controller 11 receives the notification signal TRP, the control of the PCV 9 is switched to the control on the basis of the second feedforward control value MV5, and the PCV opening degree instantaneously decreases from 100% to 30% on the basis of the second feedforward control value MV5. In this way, since the opening degree of the PCV 9 is shifted in a closed direction as the degree of the load which rapidly decreases increases, the amount of the fuel gas consumed by the load (gas turbine 15) and the flow rate of the fuel gas flowing from the upstream side into the inlet side of the compressor 1 are balanced with each other, and as a result, the pressures of the fuel gas on the upstream side and the downstream side of the compressor 1 are constantly maintained.

As shown by a solid line in FIG. 6, before the tripping occurs (before the time t0), the pressure controller 11 performs the control such that the actual inlet pressure PV3 coincides with the set pressure SV3 in the normal mode. In a case where the actual inlet pressure PV3 is stable, the opening degree of the PCV 9 is changed so as to be stable.

In addition, if tripping occurs at the time t0, the pressure controller 11 switches the mode to the emergency mode, and the PCV opening degree instantaneously (stepwise) decreases to the opening degree based on the second feedforward control value MV5 in accordance with the tripping occurring at the time to.

Thereafter, after a predetermined time (for example, one second) which is defined in advance elapses, the control switching unit 39 and the pressure controller 11 are switched to the operation performed by a normal mode again. At this time, according to the decrease in the PCV opening degree on the basis of the feedforward control, the actual inlet pressure PV3 is regulated to some extents so as to approach the set pressure SV3. However, since the feedforward control is based on the large control value by the function generator 20, at this time, in most cases, the actual inlet pressure PV3 does not become an appropriate PCV opening degree which is coincident with the set pressure SV3. Accordingly, after one second elapses (time t1) from the occurrence of the tripping, the control switching unit 39 and the pressure controller 11 performs the operation of the normal mode again, minute regulation on the basis of the feedback control is performed, and the actual inlet pressure PV3 is stable so as to be coincident with the set pressure SV3. Even when undershoot or overshoot occurs due to the feedback control, the undershoot or the overshoot is further suppressed relative to a case where the feedforward control is not present during the emergency mode (refer to the solid line in FIG. 6). Accordingly, a time (elapse time from time t0 to time t3) until the pressure inside the header tank 13 is stable is also shortened.

In this way, according to the fuel gas supply system of the first embodiment, in the case where the rapid load variation occurs during interruption of load, tripping, or the like, the control of the pressure control valve (PCV 9) which regulates the inlet pressure is switched from the feedback control of the related art to the feedforward control according to the load variation. In this way, when the rapid load variation occurs, the PCV 9 is immediately shifted to the PCV opening degree which is registered in advance so as to stabilize the inlet pressure. Accordingly, since the feedback control is performed again after the opening degree is set to an opening degree which is registered to some extents according to the rapid load variation, it is possible to decrease the width in variation occurring in the feedback control.

Second Embodiment

Hereinafter, a fuel gas supply system according to a second embodiment is described in detail with reference to FIG. 7.

Figure 7:
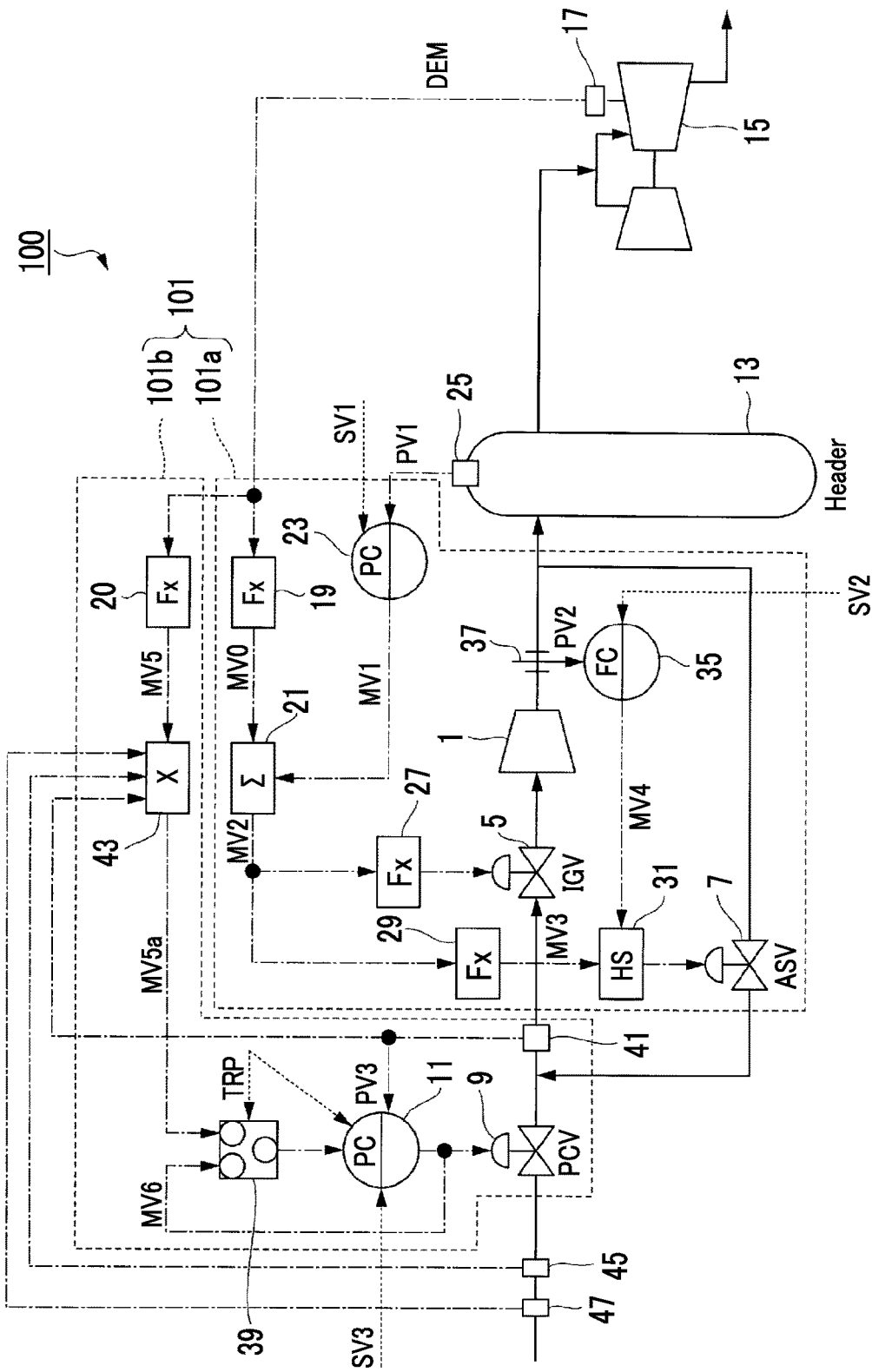
FIG. 7 is a diagram showing a functional configuration of a fuel gas supply system according to a second embodiment.

FIG. 7 is a diagram showing a functional configuration of the fuel gas supply system according to the second embodiment.

In the functional configurations of the fuel gas supply system 100 according to the second embodiment shown in FIG. 7, the same reference numerals are assigned to the same functional configurations as those of the first embodiment, and descriptions thereof are omitted.

As shown in FIG. 7, the inlet pressure control unit 101*b* of the fuel gas supply system 100 according to the second embodiment further includes an opening degree correction calculation unit 43.

The opening degree correction calculation unit 43 corrects the second feedforward control value MV5 calculated by the function generator 20 on the basis of a design value of a state quantity indicating the state of the fuel gas on the upstream side of the PCV 9 and a measured value thereof.

Here, specifically, the design value of the state quantity indicating the state of the fuel gas on the upstream side of the PCV 9 and the measured value thereof include a design value $P_1$ of the pressure (upstream side pressure) of the fuel gas on the upstream side of the PCV 9 and a measured value $P_2$ thereof, a design value $T_1$ of a temperature (upstream side temperature) of the fuel gas on the upstream side of the PCV 9 and a measured value $T_2$ thereof, and a design value $\Delta P_1$ of a differential pressure between the upstream side pressure and the downstream side pressure of the PCV 9 and a measured value $\Delta P_2$ thereof.

The opening degree correction calculation unit 43 acquires the measured value $P_2$ of the upstream pressure through a pressure meter 45 which is installed on the upstream side of the PCV 9, and acquires the measured value $T_2$ of the upstream temperature through a temperature sensor 47 which is installed on the upstream side of the PCV 9. Moreover, the opening degree correction calculation unit 43 acquires the pressure which is measured through the pressure meter 45 installed on the upstream side of the PCV 9 and the pressure which is measured through the pressure meter 41 installed on the downstream side of the PCV 9, and acquires the measured value $\Delta P_2$ which is the difference between the upstream side pressure and the downstream side pressure of the PCV 9.

In addition, the opening degree correction calculation unit 43 acquires the design value $P_1$ of the upstream side pressure which is defined when the fuel gas supply system 100 is constructed, the temperature $T_1$ on the upstream side, and the design value $\Delta P_1$ which is the difference between the upstream side pressure and the downstream side pressure of the PCV 9 in advance.

The opening degree correction calculation unit 43 calculates a correction value α by the following Expression (1) using the above-described various design values and measured values.

[Expression 1]

$$\alpha = \sqrt{\frac{P_2}{P_1} \cdot \frac{T_1}{T_2} \cdot \frac{\Delta P_1}{\Delta P_2}} \tag{1}$$

In addition, the opening degree correction calculation unit 43 multiplies the second feedforward control value MV5 by the correction value α which is calculated by Expression (1), and outputs the calculated and corrected second feedforward control value MV5*a* (MV5*a*=α×MV5) to the control switching unit 39.

Here, various controls on the basis of the function generator 20 and the pressure controller 11 are defined on the basis of the design value which is determined by the design of the upstream side (fuel gas generation source) of the fuel gas supply system 100. However, it is assumed that an actual state quantity (pressure, temperature) of the fuel gas supplied from the upstream side is deviated from the design value according to the operation state of the upstream side (fuel gas generation source).

Even in this case, according to the fuel gas supply system 100 of the second embodiment, for example, the correction value α calculated on the basis of Expression (1) is calculated so as to be a smaller value as the actual temperature (the measured value $T_2$ of the upstream side temperature) on the upstream side of the PCV 9 increases. Accordingly, when the control is switched to the feedforward control and the opening degree of the PCV 9 decreases in the case where tripping or the like occurs, in a case where the upstream side temperature increases, the PCV opening degree is further decreased by the correction value α, and flowing-in of the fuel gas from the upstream side is prevented.

In this way, even in the case where the fuel gas supply system 100 is in an operation state different from the initial design value and the rapid load variation occurs due to tripping or the like, it is possible to set a more appropriate PCV opening degree.

In addition, the specific aspect of the fuel gas supply system 100 according to the second embodiment is not limited to the above-described aspect, and various design modifications or the like may be applied to the second embodiment within a scope which does not depart from the gist. For example, the opening degree correction calculation unit 43 of the fuel gas supply system 100 according to another embodiment may calculate the correction value α on the basis of only the design value and measured value of one or two among the upstream pressure, the upstream side temperature, and the difference of the upstream side pressure and the downstream side pressure of the PVC 9. In addition, the opening degree correction calculation unit 43 may calculate the correction value α on the basis of state quantities different from the upstream pressure, the upstream side temperature, and the difference of the upstream side pressure and the downstream side pressure of the PVC 9.

Third Embodiment

Hereinafter, a fuel gas supply system according to a third embodiment is described in detail with reference to FIGS. 8 and 9.

Figure 8:
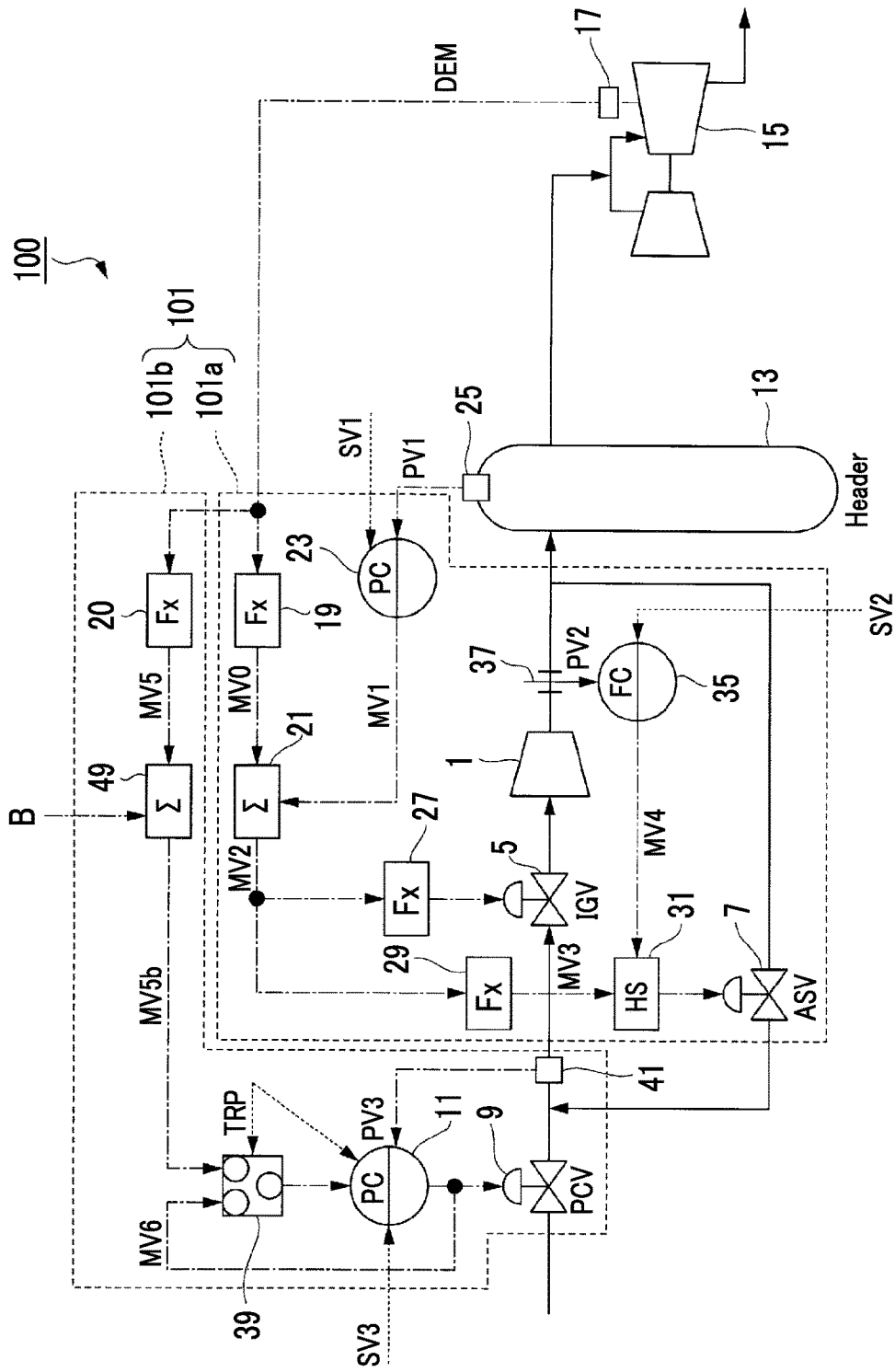
FIG. 8 is a diagram showing a functional configuration of a fuel gas supply system according to a third embodiment.

FIG. 8 is a diagram showing a functional configuration of the fuel gas supply system according to the third embodiment.

In the functional configurations of the fuel gas supply system 100 according to the third embodiment shown in FIG. 8, the same reference numerals are assigned to the same functional configurations as those of the first embodiment, and descriptions thereof are omitted.

As shown in FIG. 8, the inlet pressure control unit 101*b* of the fuel gas supply system 100 according to the third embodiment further includes a bias adder unit 49.

The bias adder unit 49 adds the second feedforward control value MV5 generated by the function generator 20 and a predetermined bias value B (B<0) which is defined in advance so as to perform correction.

For example, the bias value B is a value which corresponds to a degree of delay in a response until the set change of the PCV opening degree in the PCV 9 is completed after the function generator 20 receives the demand signal DEM.

Figure 9:
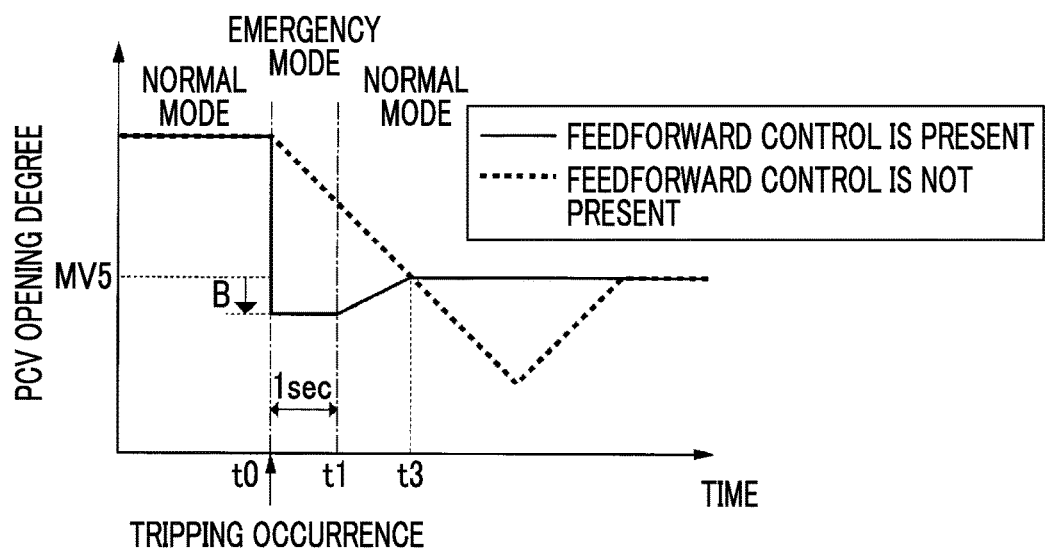
FIG. 9 is a diagram explaining operation effects of an inlet pressure control unit according to the third embodiment.

FIG. 9 is a diagram explaining operation effects of the inlet pressure control unit according to the third embodiment.

Here, when the demand signal DEM on the basis of interruption of load, tripping, or the like is output to the function generator 20, the second feedforward control value MV5 is calculated on the assumption that the set change of the PCV opening degree is ideally completed on the basis of the feedforward control at that moment. However, in actual, delay of the response occurs due to transmission delay of electric signals, and physical open and close operations of the valve in the PCV 9. That is, deviation occurs between timing when the demand signal DEM on the basis of occurrence of tripping or the like is output to the function generator 20 and timing when the set change of the PCV opening degree on the basis of the feedforward control is actually completed. In the case of the fuel gas supply system 100 according to the above-described first embodiment, due to this delay, slight undershoot may occur in the feedback control after the mode is returned from the emergency mode to the normal mode.

However, according to the fuel gas supply system 100 of the third embodiment, the bias adder unit 49 adds bias value B of the value corresponding to the pre-assumed delay of the response to the second feedforward control value MV5, and outputs the added second feedforward control value MV5*b* (MV5*b*=MV5+B (B<0)).

Accordingly, as shown by a solid line in FIG. 9, when tripping occurs (time t0), the opening degree of the PCV 9 is controlled in a state where the opening degree is further decreased by the bias value B relative to the second feedforward control value MV5. Therefore, the opening degree of the PCV 9 when tripping or the like occurs is set to an opening degree which is smaller by an anticipated delay of the response relative to the initial control value. Accordingly, when the mode is returned from the emergency mode to the normal mode, it is possible to further decrease occurrence of undershoot relative to the first embodiment.

In addition, the specific aspect of the fuel gas supply system 100 according to the third embodiment is not limited to the above-described aspect, and various design modifications or the like may be applied to the third embodiment within a scope which does not depart from the gist. Here, the above-described example, the bias value B for decreasing the undershoot due to the delay of the response is a negative value, and the opening degree of the PCV 9 is corrected so as to be decreased. However, in another embodiment, it is assumed that overshoot occurs due to the delay of response or other complex factors. In a case where this tendency is observed, the bias value B may be set to a positive value in advance.

Fourth Embodiment

Hereinafter, a fuel gas supply system according to a fourth embodiment is described in detail with reference to FIG. 10.

Figure 10:
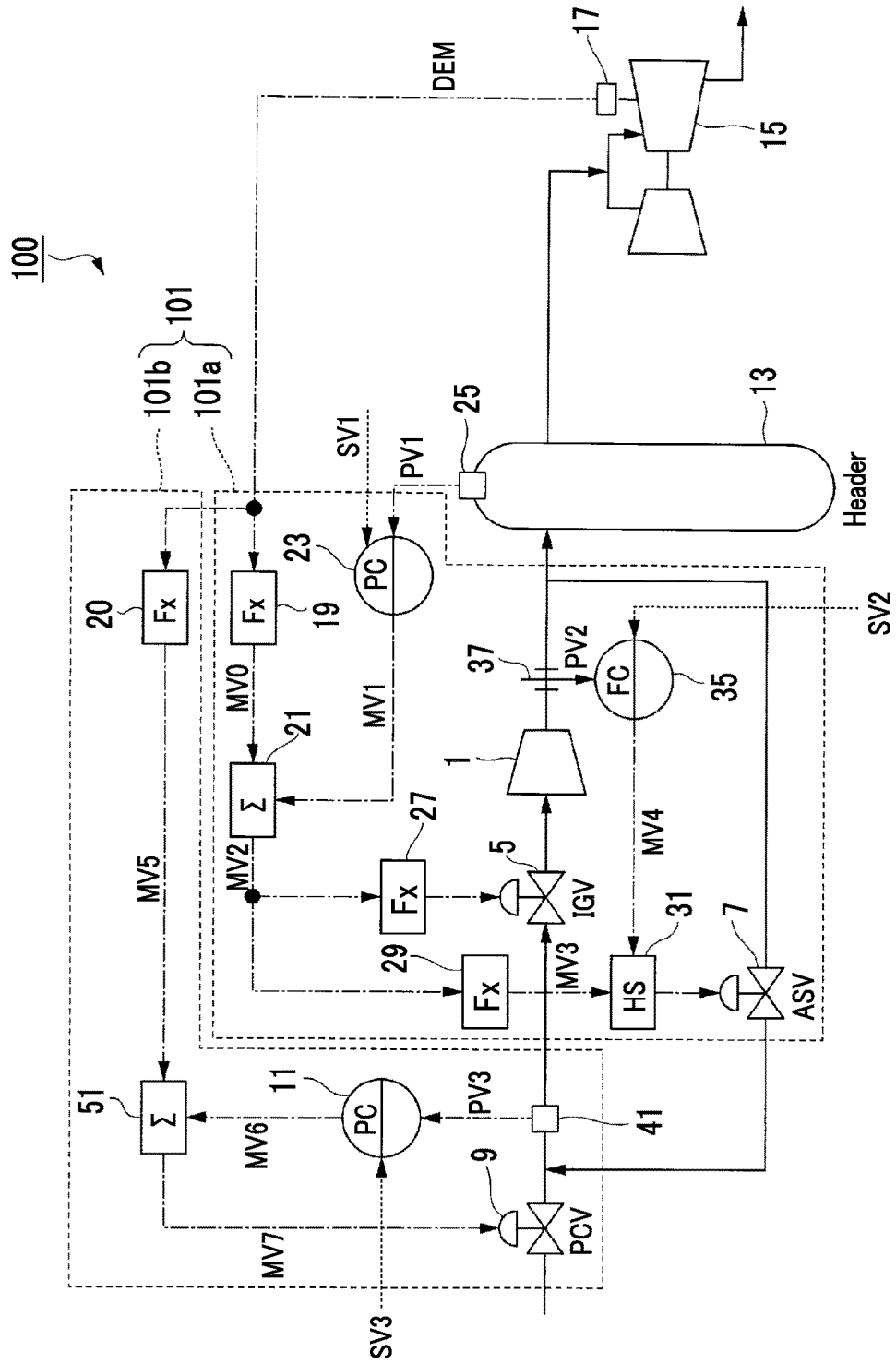
FIG. 10 is a diagram showing a functional configuration of a fuel gas supply system according to a fourth embodiment.

FIG. 10 is a diagram showing a functional configuration of the fuel gas supply system according to the fourth embodiment.

In the functional configurations of the fuel gas supply system 100 according to the fourth embodiment shown in FIG. 10, the same reference numerals are assigned to the same functional configurations as those of the first embodiment, and descriptions thereof are omitted.

As shown in FIG. 10, the inlet pressure control unit 101*b* of the fuel gas supply system 100 according to the fourth embodiment further includes an adder 51.

The adder 51 calculates a control value MV7 (MV7=MV5+MV6) which is obtained by adding the second feedforward control value MV5 generated by the function generator 20 and the inlet feedback control value MV6. The inlet pressure control unit 101*b* according to the fourth embodiment controls the PCV 9 based on both (that is, the control value MV7) of the second feedforward control value MV5 and the inlet feedback control value MV6.

In this way, in general, the fuel gas supply system 100 according to the fourth embodiment performs the control on the basis of the control value MV7 regardless of presence or absence of occurrence of tripping or the like. Accordingly, since both of the feedforward control and the feedback control are simultaneously performed, high-speed followability is realized based on the feedforward control with respect to the rapid load variation, and regulation having high accuracy on the basis of the feedback control is realized with respect to minute error components between the actual pressure and the set pressure.

In addition, since the control method does not need to be switched with respect to a normal case, occurrence of tripping, or the like, it is possible to simplify the entire configuration of the inlet pressure control unit 101*b*.

Moreover, according to the specifications of the inlet pressure control unit 101*b*, a case where the inlet feedback control value MV6 receives a value from a predetermined negative value to a predetermined positive value (for example, $-100 \leq MV6 \leq 100$) and a case where the inlet feedback control value MV6 receives a value from zero to a predetermine positive value (for example, $0 \leq MV6 \leq 100$) are assumed.

In the case where the inlet feedback control value MV6 receives a control value from a predetermined negative value to a predetermined positive value, as described above, the adder 51 calculates the control value MV7 by MV7=MV5+MV6. Meanwhile, in the case where the inlet feedback control value MV6 receives a value ($0 \leq MV6 \leq 100$) from zero to a predetermine positive value, since the adder 51 realizes the feedback control focusing on the second feedforward control value MV5, the control value MV7 is calculated by MV7=MV5+2×(MV6−50).

In addition, the above-described control device 101 includes a computer system inside the control device 101. In addition, processing processes of the above-described control device 101 are stored in a computer readable recording medium in a program format, and the processing is performed by reading and carrying-out the programs using a computer. Here, as the computer readable recording medium, there is a magnetic disk, a magneto-optical disk, a Compact Disc Read Only Memory (CD-ROM), a semiconductor memory, or the like. In addition, the computer program is transmitted to a computer via a communication line, and the computer which receives the transmission may carry-out the program.

Hereinbefore, some embodiments of the present invention are described. However, the embodiments are exemplified, and claims are not limited by the embodiments. Various aspects are applied to the embodiments, and various omission, replacements, and modifications are applied within a scope which does not depart from the gist of the present invention. The embodiments or modifications thereof are include in the scope or the gist of the present invention, and are included in the inventions described in claims and the equivalent scope thereof.

INDUSTRIAL APPLICABILITY

According to the above-described control device and control method, it is possible to more immediately stabilize variation in a pressure in a case where rapid load variation occurs in a load apparatus.

REFERENCE SIGNS LIST

100: fuel gas supply system
101: control device
101*a*: main pressure control unit
101*b*: inlet pressure control unit
1: compressor
5: inlet guide vane (inflow amount regulating means)
7: anti-surge valve
9: inlet pressure control valve
11: pressure controller
13: header tank
15: gas turbine (load apparatus)
17: load command
19: function generator
20: function generator
21: adder
23: pressure controller
25: pressure meter
27: function generator
29: function generator
31: high-level selection unit
35: flow controller
37: flow-meter
39: control switching unit
41: pressure meter
43: opening degree correction calculation unit
45: pressure meter
47: temperature sensor
49: bias adder unit
51: adder

The invention claimed is:

1. A control device which controls a fuel gas supply system which includes a compressor which compresses fuel gas to form a compressed fuel gas, and supplies the compressed fuel gas to a load apparatus, inflow amount regulator that regulates an amount of fuel gas which flows into the compressor, an anti-surge valve for returning the fuel gas discharged from the compressor to an inlet side of the compressor, and an inlet pressure control valve which regulates a pressure of the fuel gas supplied to the inflow amount regulator, wherein the control device comprises:
a main pressure control unit which controls the inflow amount regulator and the anti-surge valve using a first feedforward control value which is generated on the basis of a load of the load apparatus and a predetermined first conversion process, and a feedback control value which is generated on the basis of a deviation between a set value of a discharge pressure of the compressor and a measured value of the discharge pressure of the compressor; and
an inlet pressure control unit which controls the inlet pressure control valve using a second feedforward control value which is generated on the basis of the load of the load apparatus and a second conversion process different from the predetermined first conversion process.

2. The control device according to claim 1,
wherein the inlet pressure control unit controls the inlet pressure control valve on the basis of the second feedforward control value when the inlet pressure control unit receives a notification signal indicating that a load variation per unit time in the load apparatus is a predetermined variation width or more.

3. The control device according to claim 2, further comprising:

an opening degree correction calculation unit which corrects the second feedforward control value on the basis of a design value of a state quantity indicating a state of the fuel gas on an upstream side of the inlet pressure control valve, and a measured value of the state quantity indicating the state of the fuel gas on the upstream side of the inlet pressure control valve.

4. The control device according to claim 2, further comprising:
a bias adder unit which performs correction by adding a predetermined bias value defined in advance to the second feedforward control value generated by the inlet pressure control unit.

5. The control device according to claim 2,
wherein the inlet pressure control unit controls the inlet pressure control valve on the basis of both of the second feedforward control value, and an inlet feedback control value which is generated on the basis of a deviation between a set value and a measured value of the pressure of the fuel gas which is supplied to the inflow amount regulator.

6. The control device according to claim 1, further comprising:
an opening degree correction calculation unit which corrects the second feedforward control value on the basis of a design value of a state quantity indicating a state of the fuel gas on an upstream side of the inlet pressure control valve, and a measured value of the state quantity indicating the state of the fuel gas on the upstream side of the inlet pressure control valve.

7. The control device according to claim 6, further comprising:
a bias adder unit which performs correction by adding a predetermined bias value defined in advance to the second feedforward control value generated by the inlet pressure control unit.

8. The control device according to claim 6,
wherein the inlet pressure control unit controls the inlet pressure control valve on the basis of both of the second feedforward control value, and an inlet feedback control value which is generated on the basis of a deviation between a set value and a measured value of the pressure of the fuel gas which is supplied to the inflow amount regulator.

9. The control device according to claim 1, further comprising:
a bias adder unit which performs correction by adding a predetermined bias value defined in advance to the second feedforward control value generated by the inlet pressure control unit.

10. The control device according to claim 9,
wherein the inlet pressure control unit controls the inlet pressure control valve on the basis of both of the second feedforward control value, and an inlet feedback control value which is generated on the basis of a deviation between a set value and a measured value of the pressure of the fuel gas which is supplied to the inflow amount regulator.

11. The control device according to claim 1, wherein the inlet pressure control unit controls the inlet pressure control valve on the basis of both of the second feedforward control value, and an inlet feedback control value which is generated on the basis of a deviation between a set value and a measured value of the pressure of the fuel gas which is supplied to the inflow amount regulator.

12. A control method which controls a fuel gas supply system which includes a compressor which compresses fuel gas to form a compressed fuel gas, and supplies the compressed fuel gas to a load apparatus, inflow amount regulator that regulates an amount of fuel gas which flows into the compressor, an anti-surge valve for returning the fuel gas discharged from the compressor to an inlet side of the compressor, and an inlet pressure control valve which regulates a pressure of the fuel gas supplied to the inflow amount regulator,
wherein the control method comprises:
a step of controlling the inflow amount regulator and the anti-surge valve using a first feedforward control value which is generated on the basis of a load of the load apparatus and a predetermined first conversion process, and a feedback control value which is generated on the basis of a deviation between a set value of a discharge pressure of the compressor and a measured value of the discharge pressure of the compressor by a main pressure control unit; and
a step of controlling the inlet pressure control valve using a second feedforward control value which is generated on the basis of the load of the load apparatus and a second conversion process different from the predetermined first conversion process by an inlet pressure control unit.

* * * * *